US009282323B2

(12) United States Patent  (10) Patent No.: US 9,282,323 B2
Kim et al.  (45) Date of Patent: Mar. 8, 2016

(54) STEREOSCOPIC IMAGE DISPLAY DEVICE USING MOTION INFORMATION FROM A GYRO SENSOR AND METHOD FOR DRIVING THE SAME

(75) Inventors: Do-Heon Kim, Busan (KR); Joun-Ho Lee, Daegu (KR); Young-Sik Kim, Gumi-si (KR); Hee-Sung Woo, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 467 days.

(21) Appl. No.: 13/191,217

(22) Filed: Jul. 26, 2011

(65) Prior Publication Data
US 2012/0050268 A1 Mar. 1, 2012

(30) Foreign Application Priority Data

Aug. 26, 2010 (KR) .................... 10-2010-0083191

(51) Int. Cl.
*G06T 15/00* (2011.01)
*H04N 13/04* (2006.01)

(52) U.S. Cl.
CPC ....... *H04N 13/0413* (2013.01); *H04N 13/0497* (2013.01)

(58) Field of Classification Search
CPC .......... H04N 13/0497; H04N 13/0413; H04N 13/0014; H04N 13/0468; H04N 13/0475; H04N 13/0477; H04N 13/0484
USPC .................. 348/51, 77; 345/613; 349/15, 200
See application file for complete search history.

(56) References Cited

U.S. PATENT DOCUMENTS

| | | | |
|---|---|---|---|
| 5,349,379 A * | 9/1994 | Eichenlaub | 348/59 |
| 5,978,015 A * | 11/1999 | Ishibashi et al. | 348/47 |
| 6,198,484 B1 * | 3/2001 | Kameyama | 345/419 |
| 6,791,570 B1 * | 9/2004 | Schwerdtner et al. | 345/613 |
| 7,164,432 B1 * | 1/2007 | Amemiya | 345/649 |
| 7,245,430 B2 * | 7/2007 | Kobayashi et al. | 359/464 |

(Continued)

FOREIGN PATENT DOCUMENTS

| | | |
|---|---|---|
| CN | 101344698 A | 1/2009 |
| CN | 101419352 A | 4/2009 |

(Continued)

OTHER PUBLICATIONS

Chinese Office Action for Application No. 201110229874.0 dated Oct. 8, 2013 is provided.

*Primary Examiner* — Jay Patel
*Assistant Examiner* — Joseph Suh
(74) *Attorney, Agent, or Firm* — Birch, Stewart, Kolasch & Birch, LLP

(57) ABSTRACT

A stereoscopic image display device for sensing device motion using a gyro sensor included therein and controlling a viewing position, and a method for driving the same are disclosed, the stereoscopic image display device includes an image panel configured to output a two-dimensional image, a stereoscopic switching cell formed on the image channel and including n (n being a natural number greater than or equal to) first electrodes in a switchable region to convert the two-dimensional image into a three-dimensional image, a system including a gyro sensor, a voltage generator including a voltage source for independently applying voltages to the n first electrodes, and a stereoscopic switching cell controller configured to receive information about the motion of the system from the gyro sensor and transmit the information to the voltage generator.

12 Claims, 9 Drawing Sheets

(56) References Cited

U.S. PATENT DOCUMENTS

| | | | |
|---|---|---|---|
| 7,825,999 B2 * | 11/2010 | Chestak et al. | 349/15 |
| 8,035,763 B2 | 10/2011 | Im | |
| 8,036,763 B2 * | 10/2011 | Boe et al. | 700/44 |
| 8,085,294 B2 * | 12/2011 | Takagi et al. | 348/51 |
| 2001/0010565 A1 * | 8/2001 | Chikazawa | 349/15 |
| 2004/0263985 A1 * | 12/2004 | Boettiger | 359/618 |
| 2005/0073531 A1 * | 4/2005 | Kuroki et al. | 345/633 |
| 2006/0094480 A1 * | 5/2006 | Tanaka | 455/575.1 |
| 2006/0238545 A1 * | 10/2006 | Bakin et al. | 345/613 |
| 2007/0106473 A1 * | 5/2007 | Bodin et al. | 701/301 |
| 2008/0088753 A1 * | 4/2008 | Chestak et al. | 349/15 |
| 2009/0058845 A1 * | 3/2009 | Fukuda et al. | 345/214 |
| 2010/0019992 A1 * | 1/2010 | Maguire, Jr. | 345/8 |
| 2010/0033479 A1 * | 2/2010 | Hirayama et al. | 345/419 |
| 2010/0053539 A1 * | 3/2010 | Lin | 349/200 |
| 2010/0103516 A1 * | 4/2010 | McKnight et al. | 359/465 |
| 2010/0123716 A1 * | 5/2010 | Li et al. | 345/420 |
| 2010/0123772 A1 * | 5/2010 | Kawakami et al. | 348/51 |
| 2010/0225743 A1 * | 9/2010 | Florencio et al. | 348/46 |
| 2010/0328438 A1 * | 12/2010 | Ohyama et al. | 348/51 |
| 2011/0043715 A1 * | 2/2011 | Ohyama et al. | 349/15 |
| 2011/0084963 A1 | 4/2011 | Im | |
| 2012/0026303 A1 * | 2/2012 | Ezhov | 348/54 |
| 2012/0038751 A1 * | 2/2012 | Yuan et al. | 348/51 |
| 2012/0218325 A1 * | 8/2012 | Hiroki et al. | 345/697 |
| 2013/0128022 A1 * | 5/2013 | Bose et al. | 348/77 |

FOREIGN PATENT DOCUMENTS

| | | | | |
|---|---|---|---|---|
| CN | 101477278 A | | 7/2009 | |
| JP | 08294070 A | * | 11/1996 | H04N 5/64 |
| JP | 2002-300611 | * | 3/2001 | |
| JP | 2002-300611 A | | 10/2002 | |
| JP | 2009-104137 A | | 5/2009 | |
| KR | 10-2008-0056592 A | | 6/2008 | |
| TW | 201011350 A | | 3/2010 | |

* cited by examiner

STEREOSCOPIC IMAGE DISPLAY DEVICE USING MOTION INFORMATION FROM A GYRO SENSOR AND METHOD FOR DRIVING THE SAME

This application claims the benefit of Korean Patent Application No. 10-2010-0083191, filed on Aug. 26, 2010, which is hereby incorporated by reference as if fully set forth herein.

BACKGROUND OF THE INVENTION

1. Field of the Invention

The present invention relates to a stereoscopic image display device, and more particularly, to a stereoscopic image display device for sensing device motion using a gyro sensor included therein and controlling a viewing position, and a method for driving the same.

2. Discussion of the Related Art

Services for rapidly providing information over a high speed communication network have been developed from listening and speaking services, such as provided by a telephone, to viewing and listening multimedia type services using a digital terminal for rapidly processing text, voice and image data and, ultimately, to a three-dimensional stereoscopic information communication service for providing realistic stereoscopic viewing and entertainment.

In general, the eyes form a three dimensional image based upon the principle of stereoscopic vision. Since two eyes have a disparity therebetween, that is, since two eyes are separated from each other by about 65 mm, the left eye and the right eye view slightly different images. A difference between images caused by such difference between the positions of the two eyes is referred to as binocular disparity. A three-dimensional image display device enables the left eye to view only an image for the left eye and the right eye to view only an image for the right eye based upon such binocular disparity.

That is, the left and right eyes view two different two-dimensional images. Once these images are received by the retina and sent to the brain they are processed into a three dimensional image by the brain, providing a sense of depth to the viewer. This capability is generally referred to as streography and a device having this capability is referred to as a stereoscopic image display device.

The stereoscopic image display device may be divided into many types according to three-dimensional (3D) components. For example, a stereoscopic image display device driven by an optical path difference of a lens using a liquid crystal layer is referred to as an electrically driven liquid crystal lens type stereoscopic image display device.

In general, a liquid crystal display device includes two facing electrodes with a liquid crystal layer interposed therebetween. Liquid crystal molecules of the liquid crystal layer are arranged according to an electric field generated by applying voltages to the two electrodes. The liquid crystal molecules exhibit polarization and optical anisotropy. Polarization indicates that, when liquid crystal molecules are placed in an electric field, charges in the liquid crystal molecules are concentrated to both sides of the liquid crystal molecules such that the alignment direction of the molecules is changed according to the electric field. Optical anisotropy indicates that the path or polarization of emitted light is changed according to an incident direction or a polarized state of incident light due to the elongated structure and alignment direction of the liquid crystal molecules.

Transmittance of the liquid crystal layer is changed according to the potential difference between the two electrodes. By changing transmittance on a per pixel basis, an image can be displayed.

Recently, an electrically driven liquid crystal lens which enables a liquid crystal layer to function as a lens using the above-described characteristics of liquid crystal molecules has been proposed.

That is, the lens controls the path of incident light using a difference in refractive index between a material configuring the lens and air according to positions. If different voltages are applied to the electrodes according to positions so as to generate an electric field such that the liquid crystal layer is driven, the phase of light incident upon the liquid crystal layer varies according to positions. As a result, the liquid crystal layer can control the path of the incident light similar to an actual lens. Accordingly, it is possible to obtain an electrically driven liquid crystal lens in which an optical path difference is generated in the liquid crystal layer according to applied voltage.

However, in the electrically driven liquid crystal lens, the position of the lens is fixed. If a distance between the electrically driven liquid crystal lens and a viewer is changed by rotation of the device such that the electrically driven liquid crystal lens deviates from a regular viewing position, the viewer cannot view a stereoscopic image.

SUMMARY OF THE INVENTION

Accordingly, the present invention is directed to a stereoscopic image display device and a method for driving the same that substantially obviate one or more problems due to limitations and disadvantages of the related art.

An object of the present invention is to provide a stereoscopic image display device for sensing device motion using a gyro sensor included therein and controlling a viewing position and a method for driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image display device includes an image panel configured to output a two-dimensional image, a stereoscopic switching cell formed on the image channel and including n (n being a natural number greater than or equal to) first electrodes in a switchable region to convert the two-dimensional image into a three-dimensional image, a system including a gyro sensor, a voltage generator including a voltage source for independently applying voltages to the n first electrodes, and a stereoscopic switching cell controller configured to receive information about the motion of the system from the gyro sensor and transmit the information to the voltage generator.

The stereoscopic switching cell controller further may include a shift unit configured to shift the voltages applied to the n first electrodes.

The shift unit may receive the information about the motion of the system and controls a viewing position. The information about the motion of the system may be received from the gyro sensor and the shift of the voltages applied to the n first electrodes may be adjusted according to a deviation of the system from a regular position of a viewer. The shift unit may control the viewing position in a state in which a viewer is fixed.

The switchable region may include one barrier and a slit adjacent thereto.

The switchable region may be a region having an optical path difference of one lens.

The stereoscopic switching cell may include a first substrate including the n first electrodes, a second substrate including a second electrode, and a liquid crystal layer interposed between the first and second substrates.

The voltage source may have n output terminals and the n output terminals may be respectively connected to the n first electrodes through n signal wires formed on an edge of the first substrate.

The voltage source may apply first and second voltages to the n output terminals.

The voltage source may apply different first to m-th voltages (m being a natural number greater than or equal to 2 and less than n) to the n output terminals from edges of the switchable region to the center of the switchable region.

The stereoscopic switching cell and the image panel may be provided in a housing.

In another aspect of the present invention, a method for driving the above-described stereoscopic image display device includes providing a stereoscopic image display with a stereoscopic switching cell and a system including a gyro sensor, sensing a motion of the system using the gyro sensor, detecting a deviation of the system from a regular position of a viewer when the system moves, and applying voltages shifted according to the deviation of the system from the regular position of the viewer to the n first electrodes by the voltage generator.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
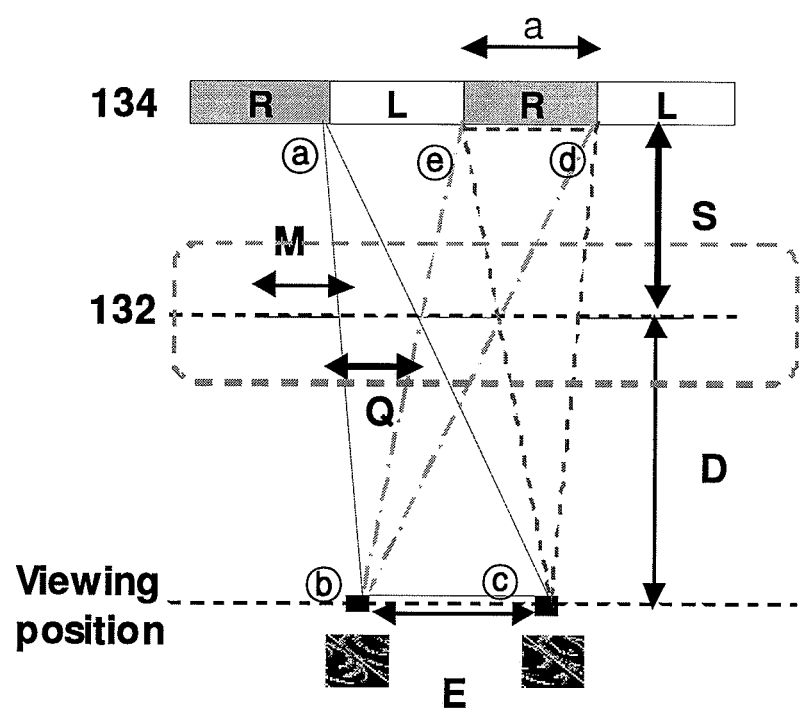
FIG. 1 is a schematic diagram showing a stereoscopic image display device according to the present invention.

FIG. 1 is a schematic diagram showing a stereoscopic image display device according to the present invention.

As shown in FIG. 1, the stereoscopic image display device according to the present invention basically includes a stereoscopic switching cell 132 and an image panel 134.

The stereoscopic switching cell 132 has a barrier function. Barriers and slits having a width ratio of M:Q are arranged according to applied voltage. A viewer and the stereoscopic switching cell 132 are separated from each other by a viewing distance D.

The image panel 134 outputs a two-dimensional image. Examples of the image panel 134 include a flat display panel such as a liquid crystal panel, a plasma display panel, an organic electroluminescent display panel and an electrophoretic display panel.

Here, a denotes the width of the image panel 134 corresponding to a left eye or a right eye and may denote one subpixel or the pitch of one pixel.

The stereoscopic switching cell 132 can independently apply signals to electrodes included therein such that the positions of the barriers and slits formed when applying the voltage differ from initial positions thereof. That is, if a device is rotated or moved in order to execute an application such as a game, a positional relationship between the viewer and the device may be changed. In this case, if the device is moved in a state in which the viewer is fixed, in consideration of a deviation of the device from the viewer, the shifted voltages are applied to the electrodes, the positions of which are changed. Then, the viewer can stably view a stereoscopic image regardless of motion of the device.

Here, the term "device" described herein refers to a stereoscopic image display device including the stereoscopic switching cell, the image panel, a housing in which the stereoscopic switching cell and the image panel are mounted, and a system for controlling the stereoscopic switching cell and the image panel.

Figure 2:
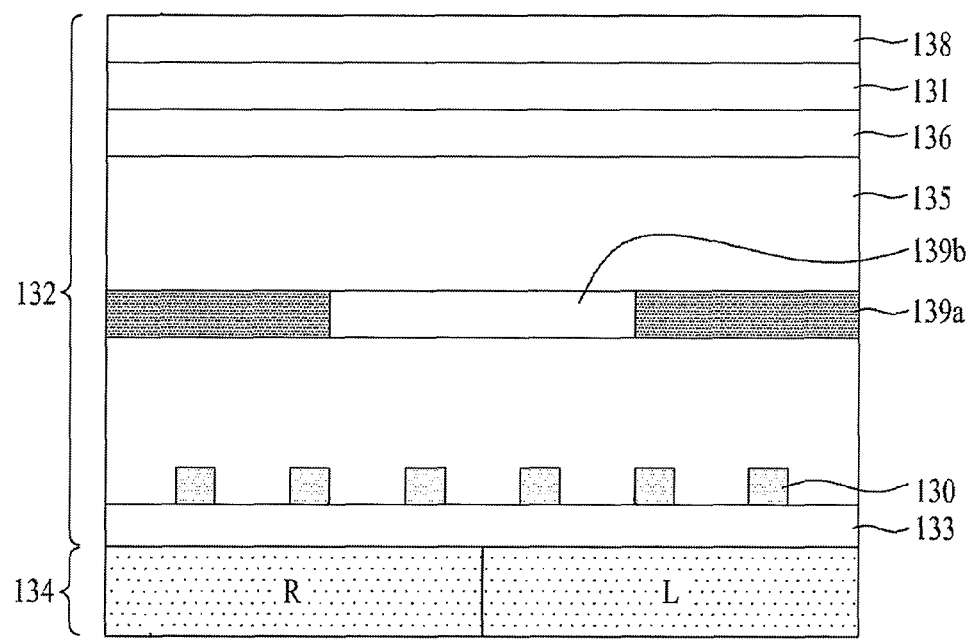
FIG. 2 is a cross-sectional view of a stereoscopic switching cell of FIG. 1.

FIG. 2 is a cross-sectional view of the stereoscopic switching cell of FIG. 1.

As shown in FIG. 2, the stereoscopic switching cell of FIG. 1 includes first and second substrates 133 and 131 facing each other, a plurality of first electrodes 130 formed on the first substrate 133, a second electrode 136 formed over the entire surface of the second substrate 131, and a liquid crystal layer 135 formed between the first substrate 133 and the second substrate 131.

An optical film such as a polarization plate 138 is formed on a rear surface of the second substrate 131, in order to shield a black region 139a, which is not completely shielded by liquid crystal alignment, in the stereoscopic switching cell 132 including a black region 139a and a white region 139b.

The first electrodes 130 and the second electrode 136 are transparent electrodes.

A voltage source (not shown) for applying voltages to the first electrodes 130 and the second electrode 136 is further included.

The voltage source independently applies signals to the plurality of first electrodes 130.

The black region 139a and the white region 139b are shown in FIG. 2. A first voltage V1 which is a high voltage is applied to the first electrodes 130 in the black region 139a and a ground voltage or a constant voltage is applied to the first electrodes 130 in the white region 139b. The voltage applied to the second electrode 136 is equal to the ground voltage or the constant voltage applied to the first electrodes 130 in the white region 139b.

The stereoscopic switching cell 132 is switched depending on whether or not a voltage is applied thereto. A two-dimensional image output from the image panel 134 is displayed without conversion when the voltage is not applied. When the voltage is applied, as shown in FIG. 2, the liquid crystal alignment of the liquid crystal layer 135 in the black region 139a differs from that in the white region 139b. The black region 139a functions as a barrier, and an image for a right eye and an image for a left eye output from the image panel 134 are divided by the black region 139a and transmitted to the viewer.

The stereoscopic switching cell 132 is normally in a white mode and the black region 139a is defined when a vertical electric field is formed between upper and lower electrodes.

Hereinafter, a method of applying voltages to the first electrodes 130 according to device motion will be described.

Figure 3A:
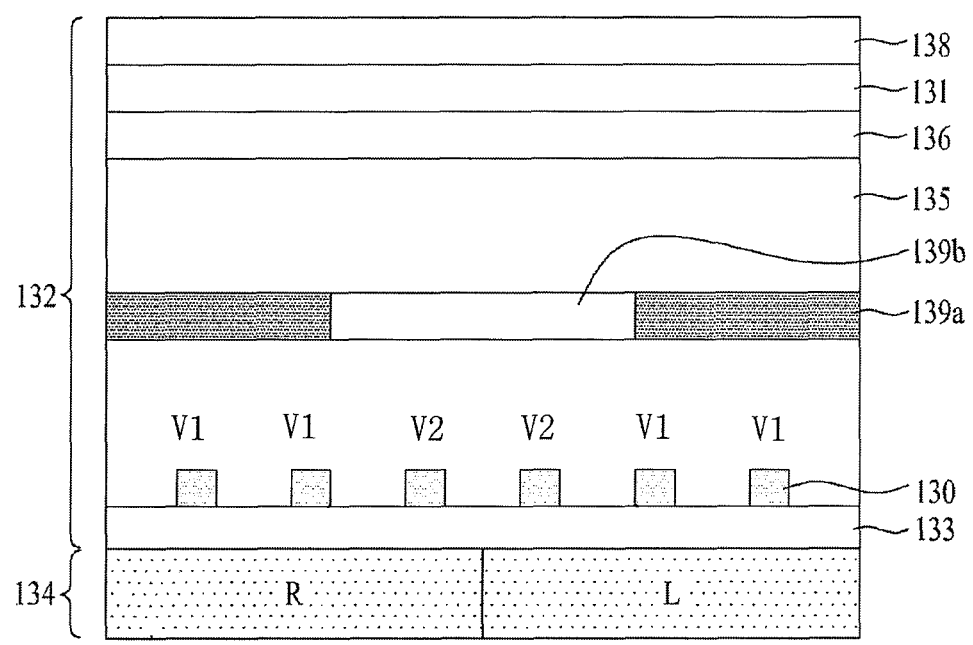
FIGS. 3A and 3B are diagrams showing a method of applying voltages when the stereoscopic image display device according to the present invention is placed at a regular position and is rotated.
Figure 3B:
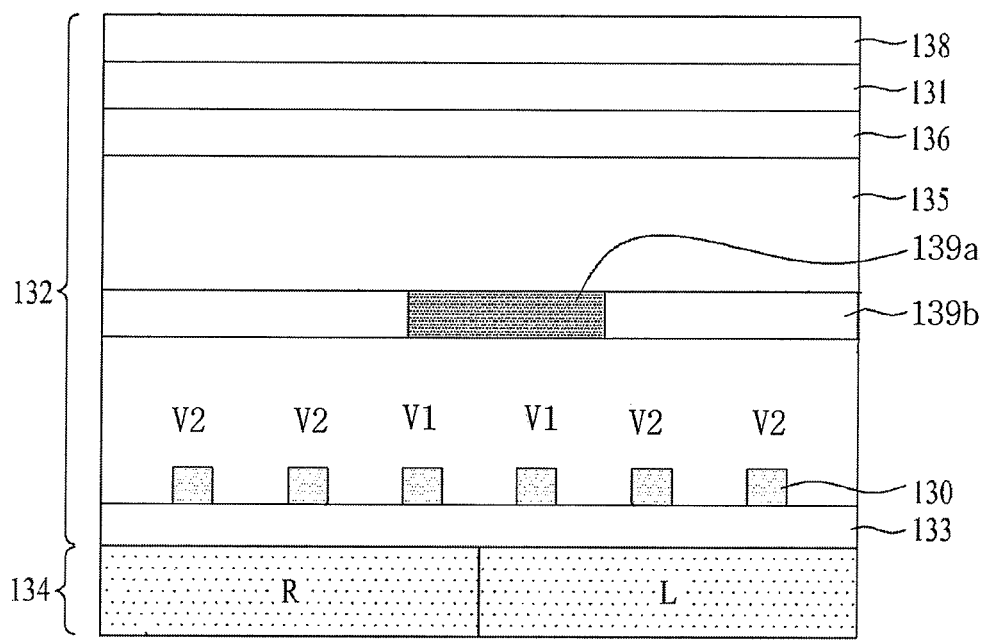

FIGS. 3A and 3B are diagrams showing a method of applying voltages when the stereoscopic image display device according to the present invention is placed at a regular position and is rotated.

FIG. 3A shows a state in which the stereoscopic image display device according to the present invention is placed at a regular position. A first voltage V1 and second voltage V2 are respectively applied to the first electrodes 130 in correspondence with the black region 139a and the white region 139b.

If the stereoscopic image display device is rotated or moved as shown in FIG. 3B, the stereoscopic image display device deviates from the regular position of the viewer. That is, the viewer is fixed and the stereoscopic image display device including the stereoscopic switching cell 132 deviates from the regular position of the viewer. In this case, the voltages applied to the first electrodes 130 in the stereoscopic switching cell 132 are shifted due to the deviation from the regular position of the viewer such that the viewer can view a stereoscopic image without turning their head or eyes even when the stereoscopic image display device is rotated or moved.

In this case, although the viewer remains stationary, from the viewpoint of the stereoscopic switching cell 132, the order of voltages applied to the first electrodes 130 is changed such that the viewing position is changed.

Figure 4:
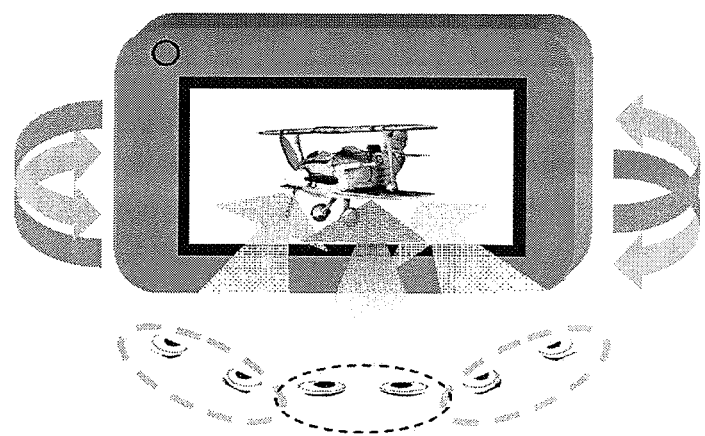
FIG. 4 is a diagram showing a variation in a viewer's position according to rotation of the device when a gyro sensor is included in the stereoscopic image display device.

FIG. 4 is a diagram showing a variation in a viewer's position according to the rotation of the device when a gyro sensor is included in the stereoscopic image display device.

As shown in FIG. 4, in the stereoscopic image display device, when the stereoscopic switching cell operates regardless of motion sensing of the gyro sensor, the black region and the white region formed in the stereoscopic switching cell are fixed. Thus, in order to view a stereoscopic image, the viewer must move according to the motion of the stereoscopic image display device. That is, if the stereoscopic image display device is rotated, the viewer must turn their eyes or head. For example, if an application such as a 3D game is executed using the stereoscopic image display device, the viewer must move.

The gyro sensor senses motion of a mobile body. The gyro sensor measures an angular velocity in an inertial system and senses a movement distance of the mobile body. The gyro sensor can sense motion in three dimensions (along X, Y and Z axes).

Figure 5:
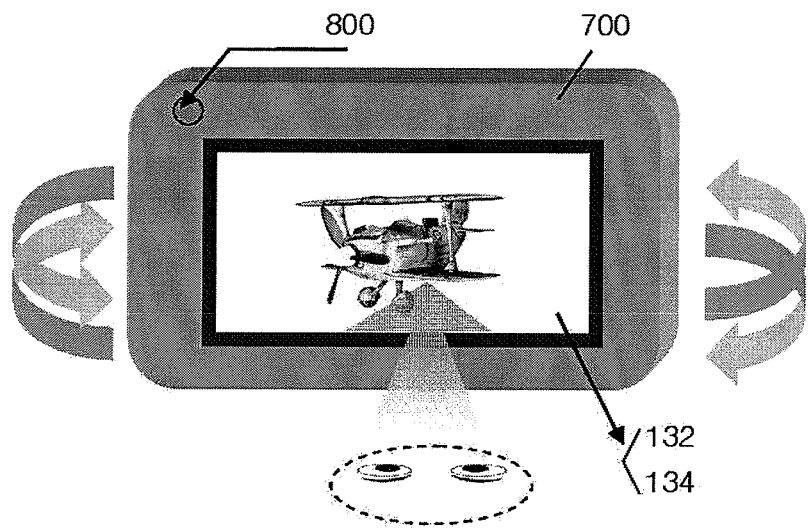
FIG. 5 is a diagram showing an example of sensing device motion using the gyro sensor and controlling a viewing position in the stereoscopic image display device according to the present invention.

FIG. 5 is a diagram showing an example of sensing device motion using the gyro sensor and controlling a viewing position in the stereoscopic image display device according to the present invention.

As shown in FIG. 5, in the stereoscopic image display device according to the present invention, voltages are applied to the first electrodes (see 130 of FIG. 2) according to information about the motion of the stereoscopic image display device sensed by the gyro sensor 800. In this case, voltages shifted according to movement of stereoscopic image display device are applied to the first electrodes 130 of the stereoscopic switching cell such that the viewer can view a stereoscopic image without moving.

The gyro sensor 800 is mounted in a system 700 including a housing.

In the system 700, the laminated stereoscopic switching cell 134 and image panel 132 are included in the housing. In this case, the viewer views the image at the side of the stereoscopic switching cell 134.

Figure 6:
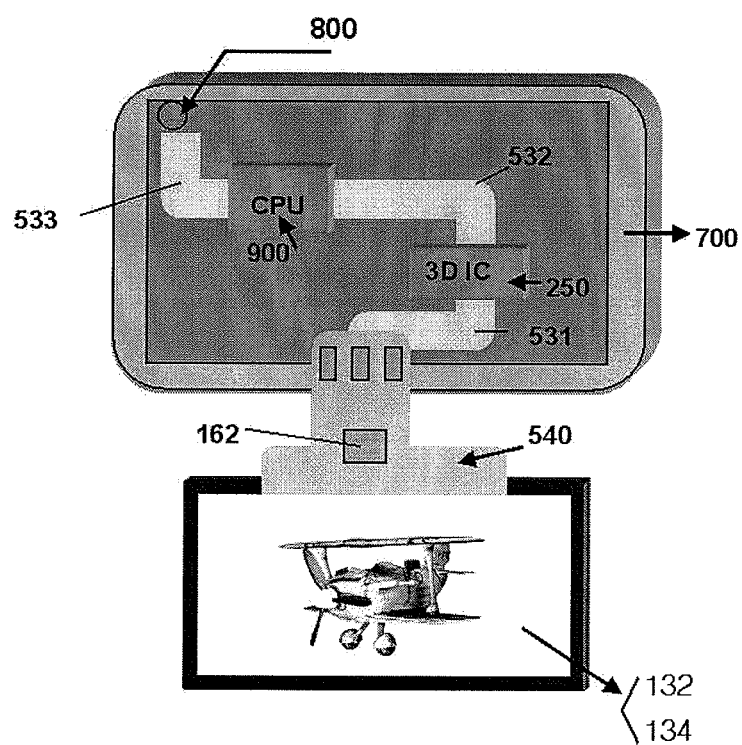
FIG. 6 is a schematic diagram showing the configuration of the stereoscopic image display device according to the present invention.
Figure 7:
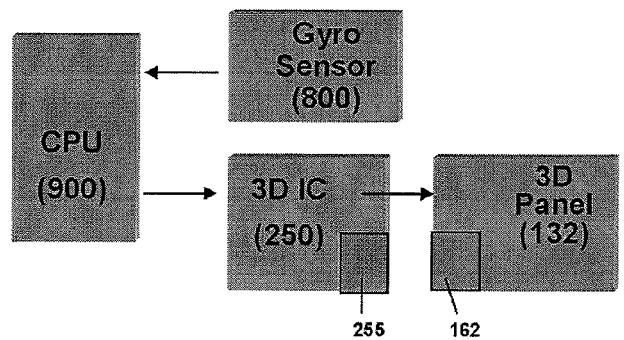
FIG. 7 is a block diagram showing a driving relationship between the gyro sensor of FIG. 6 and a stereoscopic switching cell.
Figure 8:
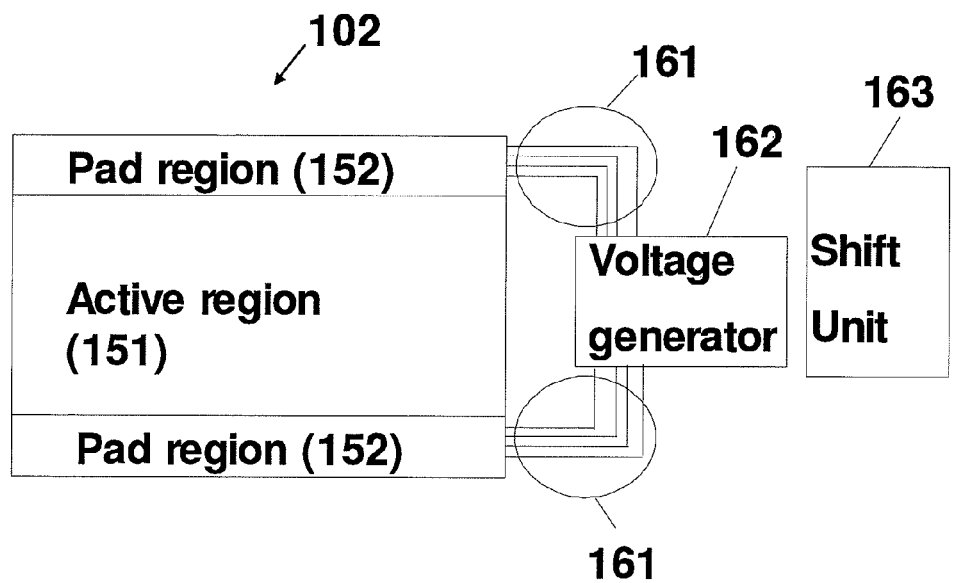
FIG. 8 is a block diagram showing a stereoscopic switching cell of the stereoscopic image display device according to the present invention.

FIG. 6 is a schematic diagram showing the configuration of the stereoscopic image display device according to the present invention, FIG. 7 is a block diagram showing a driving relationship between the gyro sensor of FIG. 6 and the stereoscopic switching cell, and FIG. 8 is a block diagram showing the stereoscopic switching cell of the stereoscopic image display device according to the present invention.

Referring to FIGS. 6 to 8, the stereoscopic image display device 100 according to the present invention includes the image panel 134 for outputting a two-dimensional image, the stereoscopic switching cell 132 including the n (n is a natural number greater than or equal to 2) first electrodes (see 130 of FIG. 2) formed on the image panel 134 in a switchable region to convert the two-dimensional image into a three-dimensional image according to the applied voltages, the system 700 having the gyro sensor 800 mounted therein, a voltage generator 162 including the voltage source for independently applying voltages to the n first electrodes 130, and a stereoscopic switching cell controller 250 for receiving information about motion of the system 700 from the gyro sensor 800 and transmitting the information to the voltage generator 162.

A shift unit 255 for shifting the voltages applied to the n first electrodes 130 is further included in the stereoscopic switching cell controller 250.

That is, the shift unit 255 receives the information about the motion of the system 700 and controls a viewing position. At this time, the information about the motion of the system 700 is received from the gyro sensor 800 and the shift of the voltages applied to the n first electrodes 130 are adjusted according to the deviation of the system 700 from the regular position of the viewer. The shift unit 255 controls the viewing position by controlling the order of voltages applied in a state in which the viewer is fixed.

The switchable region includes one black region (barrier) and the white region (slit) adjacent thereto.

Reference numeral 540 of FIG. 6 denotes a Flexible Printed Cable (FPC) connected to a pad region 152 of the stereoscopic switching cell 132. The voltage generator 162 may be formed on the FPC 540. In some cases, the voltage generator 162 and the shift unit 255 are included in the stereoscopic switching cell controller 250.

Reference numerals 532, 532 and 533 denote a connection for connecting the FPC 540 and the stereoscopic switching cell controller 250, a connection for connecting the stereoscopic switching cell controller 250 and a system CPU 900, and a connection for connecting the system CPU 900 and the gyro sensor 800, respectively. These connections are connection wires or connectors.

Although not shown, the image panel 134 has an image panel PCB (not shown) and the PCB is connected to the system CPU 900, in order to control the system 700.

An active region 151 shown in FIG. 8 is a region in which the black region and the white region are formed in order to view the stereoscopic image, and the first electrodes 130 are arranged in parallel in one direction as described with reference to FIG. 2.

Figure 9:
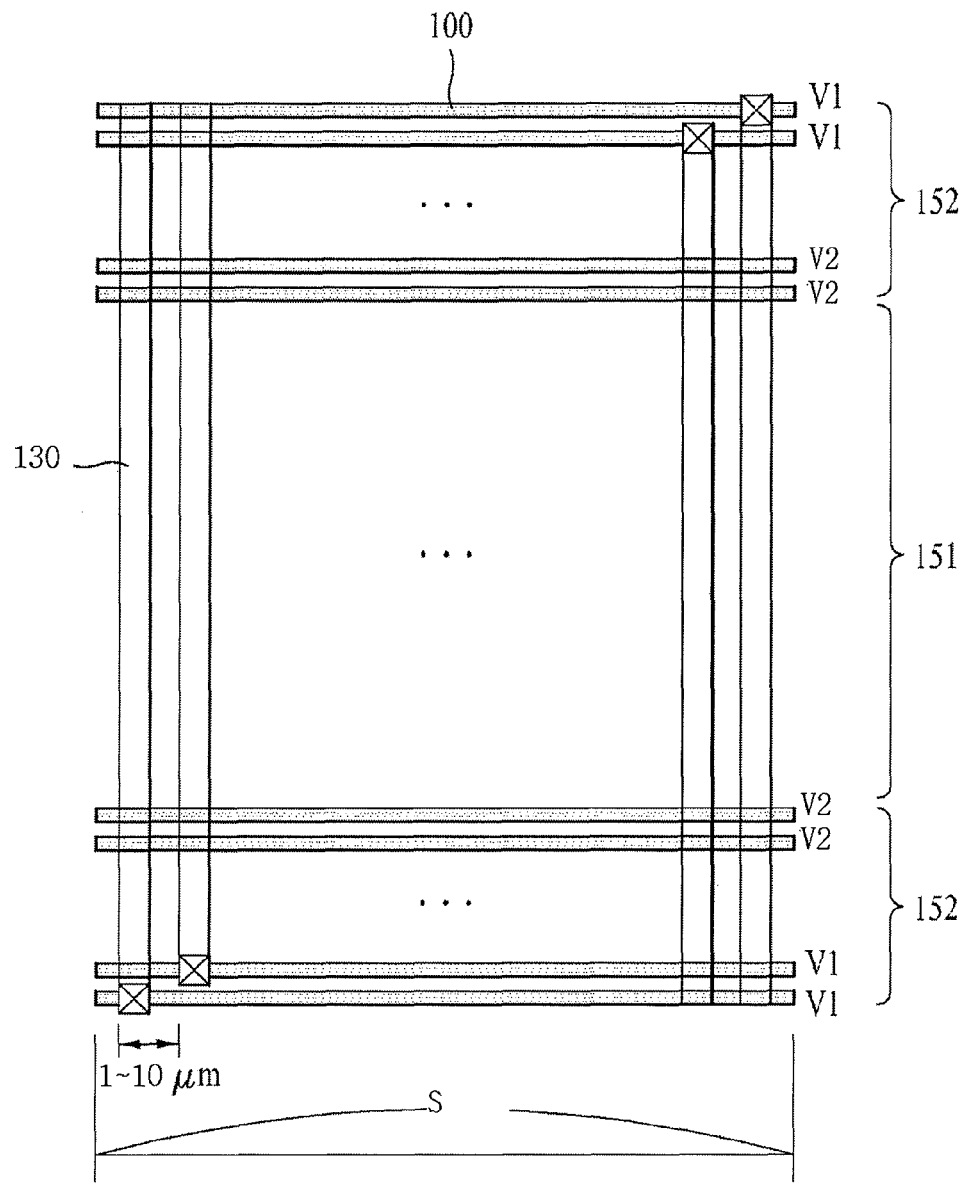
FIG. 9 is a plan view showing voltage application when a stereoscopic switching cell according to the present invention is placed at a regular position and is rotated.

FIG. 9 is a plan view showing the stereoscopic switching cell according to the present invention.

As shown in FIG. 9, in the stereoscopic switching cell according to the present invention, the first electrodes 130 extend to the pad region 152 so as to be respectively connected to n metal wires 100 which are formed so as to cross the first electrodes 130 in the pad region 152. The n metal wires 100 are respectively connected to n output terminals of the voltage generator 162 through the FPC 540.

If the stereoscopic image display device is placed at a regular position of the viewer, the first voltage V1 having a high level is applied to the black region and a second voltage such as a ground voltage or a constant voltage lower than the first voltage is applied to the white region in the switchable region.

If the stereoscopic image display device deviates from the regular position of the viewer by rotation or motion, the deviation is sensed using the gyro sensor and the first voltage and the second voltage are shifted and applied according to the deviation. Thus, even when the viewing position of the stereoscopic switching cell is changed, the viewer can view the stereoscopic image.

Although the liquid crystal barrier cell using the barrier is described in the above-described stereoscopic image display device according to the present invention, the present invention is not limited thereto and is equally applicable to an electrically driven liquid crystal lens type device.

Hereinafter, an electrically driven liquid crystal lens type stereoscopic switching cell will be described.

Figure 10A:
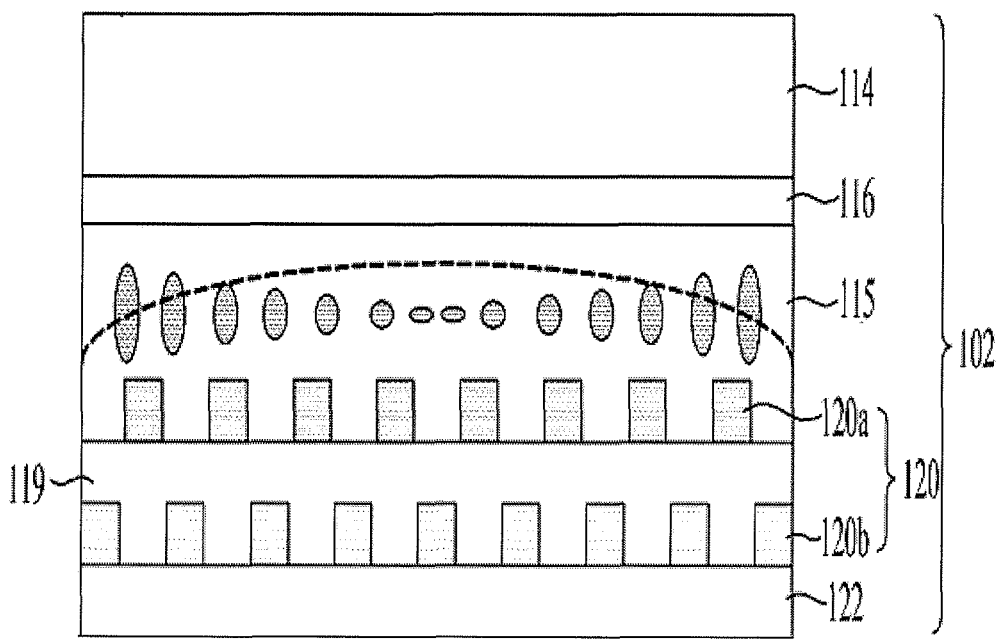
FIG. 10A is a cross-sectional view showing voltage application when the stereoscopic switching cell of the stereoscopic image display device according to another embodiment of the present invention is placed at a regular position and is rotated.
Figure 10B:
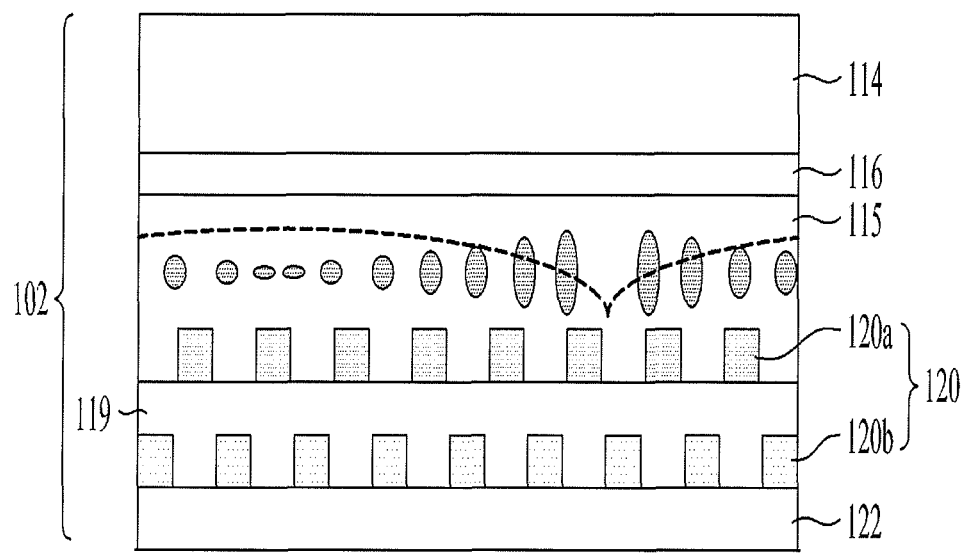
FIG. 10B is a cross-sectional view showing a variation in viewing position of FIG. 10A.

FIG. 10A is a cross-sectional view showing a stereoscopic switching cell of a stereoscopic image display device according to another embodiment of the present invention, and FIG. 10B is a cross-sectional view showing a variation in viewing position from that of FIG. 10A.

As shown in FIG. 10A, in an electrically driven liquid crystal lens type stereoscopic switching cell, the number of first electrodes 120 formed in a switchable region S may be increased in order to implement a minute lens profile. In the figure, the first electrodes 120 are formed in a double layer structure. The first lower electrodes 120b are formed on a first substrate 122 and the first upper electrodes 120a are formed on an insulating film 119 covering the first electrodes 120b.

The first electrodes 120 of the electrically driven liquid crystal lens type stereoscopic switching cell may be implemented in a single layer structure, instead of the double layer structure. In some cases, the first electrodes 120 may be formed in a three-layer structure. A gap between the first electrodes 120, the width of the first electrodes 120, and the number of first electrodes 120 in the switchable region are set in consideration of a lens profile to be implemented.

Reference numeral 114 denotes a second substrate, 116 denotes a second electrode, 115 denotes a liquid crystal layer, and 102 denotes an electrically driven liquid crystal lens type stereoscopic switching cell.

In this case, the switchable region is a region having an optical path difference of one lens when a voltage is applied.

The voltage generator 162 applies first to m-th voltages (m being a natural number greater than or equal to 2 and less than n) to n output terminals from both edges of the switchable region to the center of the switchable region. The voltage signals are symmetrically applied from the center of the switchable region to both edges of the switchable region.

As shown in FIG. 10B, if the stereoscopic image display device deviates from the regular position of the viewer, in the stereoscopic switching cell 102 of the stereoscopic image display device, the order of voltages applied to the first electrodes 120 is changed so as to change the viewing position such that the viewer views the stereoscopic image. From the viewpoint of the stereoscopic switching cell, the applied voltages are shifted so as to define the electrically driven liquid crystal lens.

That is, when the stereoscopic image display device of the present invention moves, the voltages applied to the first electrodes 120 are shifted so as to prevent the stereoscopic image viewing position from shifting from the viewer's eyes.

The method for driving the stereoscopic image display device will now be described.

Referring to FIGS. 2 and 6 to 9, first, the motion of the system 700 is sensed using the gyro sensor 800.

Subsequently, when the system 700 moves, the deviation of the system 700 from the regular position of the viewer is sensed.

Subsequently, the voltage generator 162 applies the shifted voltages to the n first electrodes 130 according to the deviation of the system 700 from the regular position of the viewer such that the viewer views the stereoscopic image.

The stereoscopic image display device of the present invention has the following effects.

First, the signals are independently applied to the electrodes of the stereoscopic switching cell such that the viewer can view a stereoscopic image even in an application such as a game in which the device is rotated or twisted.

Second, since the gyro sensor is included, the motion sensing signal is received from the gyro sensor. Thus, the viewer can view the stereoscopic image at the changed viewing position even when the device is rotated. It is possible to prevent the stereoscopic image from being deviated from the viewer's eyes when the device is moved.

Third, since the signals are independently applied to the plurality of first electrodes so as to control the viewing position, the stereoscopic switching cell may be used only in the liquid crystal barrier cell but also in the electrically driven liquid crystal lens type cell.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic image display device comprising:
an image panel configured to output a two-dimensional image and including a plurality of pixels;
a stereoscopic switching cell formed on the image panel and including n, n being a natural number greater than or equal two, first electrodes in each switchable region to convert the two-dimensional image into a three-dimensional image by generating a non-transparent region and a transparent region, the non-transparent region forming a barrier to divide an image for a right eye and an image for a left eye, and the transparent region forming a slit to transmit the respective images;
a system including a gyro sensor configured to sense a motion of the stereoscopic display device;
a voltage generator including a voltage source for independently applying at least two different voltages respectively to a first set and a second set of the n first electrodes of the stereoscopic switching cell, the first set corresponding to the non-transparent region and the second set corresponding to the transparent region; and
a stereoscopic switching cell controller including a shift unit configured to shift the at least two different voltages respectively applied to the first set and the second set of the n first electrodes of the stereoscopic switching cell, wherein the stereoscopic switching cell controller receives information about the motion of the stereoscopic image display device from the gyro sensor, and transmits the information about the motion of the stereoscopic image display device to the voltage generator by the shift unit and controls to maintain a viewing position of the stereoscopic display device relative to a viewer by shifting the at least two different voltages applied to the switchable region of the stereoscopic switching cell based on the motion of the stereoscopic image display device sensed by the gyro sensor so that the at least two different voltages applied to the first set and the second set of the n first electrodes of the stereoscopic switching cell are different after the shift,
wherein the information about the motion of the stereoscopic image display device is received from the gyro sensor and the shift of the at least two different voltages respectively applied to the first set and the second set of the n first electrodes of the stereoscopic switching cell is adjusted according to a deviation of the stereoscopic image display device from a position of the viewer,
wherein the shift unit controls the viewing position in a state in which a direction of view of the viewer is fixed,
wherein the switchable region includes one barrier corresponding to the non-transparent region and a slit adjacent thereto corresponding to the transparent region,
wherein the voltage source has n output terminals and the n output terminals are respectively connected to the n first electrodes through n signal wires formed on an edge of the first substrate, and
wherein the voltage source applies first and second voltages to the n output terminals.

2. The stereoscopic image display device according to claim 1, wherein the switchable region is a region having an optical path difference of one lens.

3. The stereoscopic image display device according to claim 1, wherein the stereoscopic switching cell includes:
a first substrate including the n first electrodes;
a second substrate including a second electrode; and
a liquid crystal layer interposed between the first and second substrates.

4. The stereoscopic image display device according to claim 3, wherein the voltage source applies different first to m-th voltages, m being a natural number greater than or equal to 2 and less than n, to the n output terminals from edges of the switchable region to the center of the switchable region.

5. The stereoscopic image display device according to claim 1, wherein the stereoscopic switching cell and the image panel are provided in a housing.

6. A method for driving a stereoscopic image display device, the method comprising:
providing a stereoscopic image display device with an image panel configured to output a two-dimensional image and including a plurality of pixels, a stereoscopic switching cell including more than three first electrodes in each switchable region to convert a two-dimensional image into a three-dimensional image and a system including a gyro sensor configured to sense a motion of the stereoscopic display device;
sensing a motion of the stereoscopic image display device using the gyro sensor;
detecting a deviation of the stereoscopic image display device from a position of a viewer when the stereoscopic image display device moves or rotates;
applying at least two different voltages to the first electrodes in each switchable region of the stereoscopic switching cell; and
shifting the switchable region by shifting an order of the at least two different voltages applied to the first electrodes according to a deviation of the stereoscopic image display device from the position of the viewer based on the motion of the stereoscopic display device sensed by the gyro sensor,
wherein the viewer is fixed and the stereoscopic image display device is rotated or moved from the viewer when there is the deviation of the system from the position of the viewer, and
wherein the switchable region includes one barrier corresponding to a non-transparent region and a slit adjacent thereto corresponding to a transparent region.

7. A stereoscopic image display device comprising:
an image panel configured to output a two-dimensional image and including a plurality of pixels;
a stereoscopic switching cell formed on the image panel and including more than three first electrodes in each switchable region to convert the two-dimensional image into a three-dimensional image;
a system including a gyro sensor configured to sense a motion of the system, wherein the image panel and the stereoscopic switching cell are laminated in the system, and the system has a housing on which the gyro sensor is mounted;
a voltage generator including a voltage source for independently applying at least two different voltages respectively to the first electrodes of the stereoscopic switching cell; and
a stereoscopic switching cell controller including a shift unit configured to shift an order of the at least two different voltages applied to the first electrodes of the stereoscopic switching cell,
wherein the stereoscopic switching cell controller receives information about the motion of the system from the gyro sensor when there is a deviation of the stereoscopic image display device from a position of a viewer, and shifts the switchable region by shifting the order of the at least two different voltages applied to the first electrodes of the stereoscopic switching cell based on the motion of the system sensed by the gyro sensor, wherein the viewer is fixed and the stereoscopic image display device is rotated or moved from the viewer when there is the deviation of the system from the position of the viewer, and wherein the switchable region includes one barrier corresponding to a non-transparent region and a slit adjacent thereto corresponding to a transparent region.

8. The stereoscopic image display device according to claim 7, wherein the switchable region is a region having an optical path difference of one lens.

9. The stereoscopic image display device according to claim 7, wherein the stereoscopic switching cell includes:
a first substrate and a second substrate facing each other;
the first electrodes on the first substrate, arranged as n first electrodes in each switchable region;
a second electrode on the second substrate; and
a liquid crystal layer interposed between the first and second substrates.

10. The stereoscopic image display device according to claim 9, wherein the voltage source has n output terminals and the n output terminals are respectively connected to the n first electrodes through n signal wires formed on an edge of the first substrate.

11. The stereoscopic image display device according to claim 10, wherein the voltage source applies first and second voltages to the n output terminals.

12. The stereoscopic image display device according to claim 10, wherein the voltage source applies different first to m-th voltages, m being a natural number greater than or equal to 2 and less than n, to the n output terminals from edges of the switchable region to the center of the switchable region.

* * * * *